Patented Feb. 13, 1923.

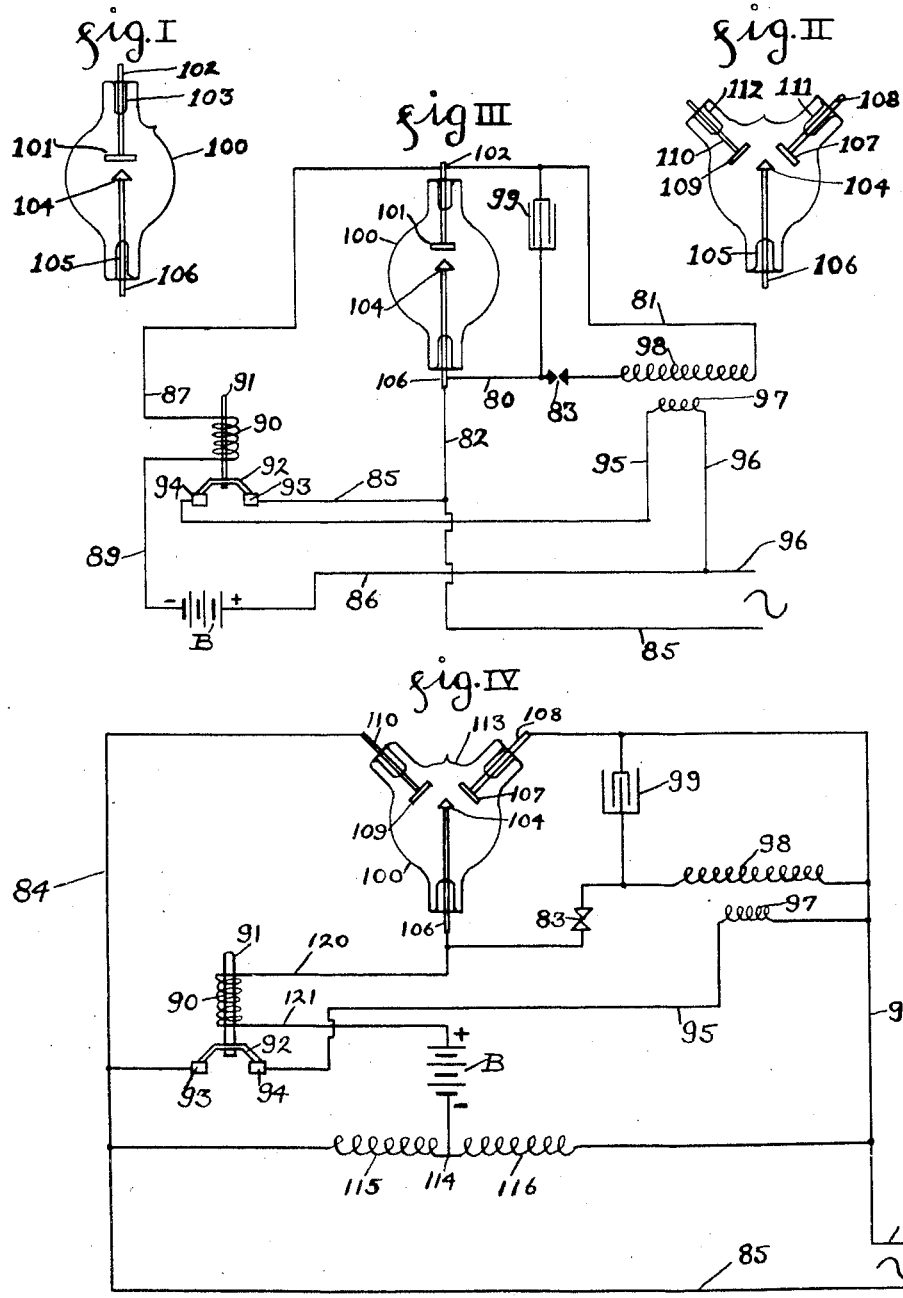

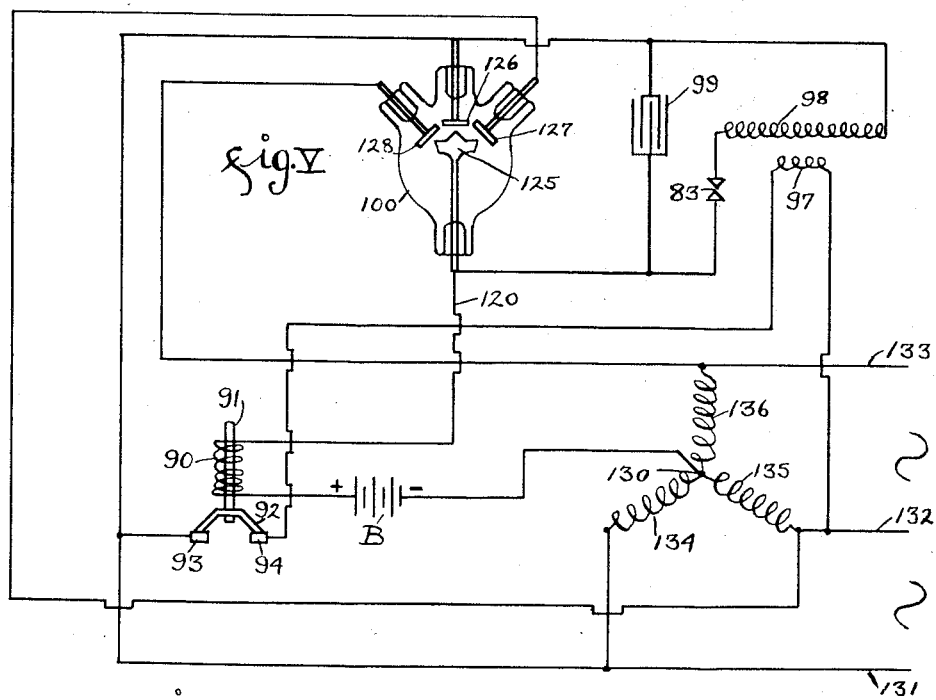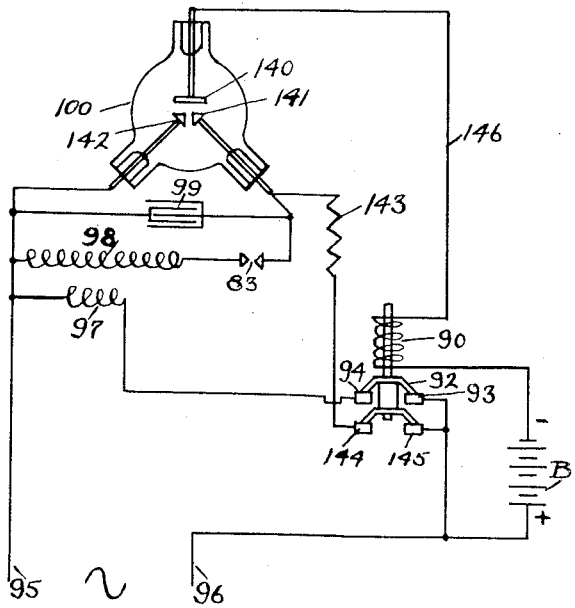

1,445,206

UNITED STATES PATENT OFFICE.

JAMES K. ELDERKIN, OF NEWARK, NEW JERSEY.

THERMIONIC RECTIFIER AND CIRCUITS THEREFOR.

Application filed July 8, 1921. Serial No. 483,238.

*To all whom it may concern:*

Be it known that I, JAMES K. ELDERKIN, a citizen of the United States, and residing in the city of Newark, county of Essex, and State of New Jersey, have invented certain new and useful Improvements in Thermionic Rectifiers and Circuits Therefor, of which the following is a specification.

This invention relates to the apparatus and associated circuits for the rectification of alternating current with a view to a solution of the difficulties and limitations of the present devices for this purpose.

The particular application of this invention is that of converting standard commercial alternating current to direct current for the purpose of charging batteries; operating motors, projection arcs, series arc lamps, and other devices where a direct current is desired.

The principal object of this invention is to provide a simple and efficient means of rectification of alternating current to direct curent of high ampere capacity, to provide a rectifier which will be self-starting in case of line failures, requiring no delicate relays or protective apparatus and which will be inexpensive to build and require no skill to operate.

Another object is to produce a rectifier which does not require a delicate filament for its operation and which entails a very low wattage loss in bringing about the conversion or rectification. Further objects will hereinafter appear.

Briefly, the salient features of the invention consist of an alternating current source of supply, a transformer, a high potential transformer with capacity and auxiliary spark gap, a rectifying tube, an electromagnetic switch and a direct current load.

The accompanying drawings show forms of systems embodying my invention. In these drawings:—

Figure 1 shows a rectifier tube for rectifying half cycles of a single phase current, Figure 2 shows a rectifier tube for rectifying both waves of a cycle of single phase current.

Figure 3 is a diagrammatic representation of a complete rectifier embodying a system for half cycle single phase rectification, Figure 4 shows a system for two wave single phase rectification, Figure 5 shows a system for rectification of a three phase current, Figure 6 shows a single wave rectification system the same as described in Figure 3 except that an auxiliary electrode is provided in the tube for the purpose of starting and maintaining rectification at low ampere output, and Figure 7 shows a tube with a form of cathode slightly different from that disclosed in the other figures.

In Figure 1 a rectifier tube is shown which consists of a glass envelope 100 having a carbon anode or target 101 secured to a lead-in wire 102 which is sealed in the tube 100 by an air-tight seal 103 at the top. At the bottom of the tube another lead-in wire 106 is sealed in by means of the seal 105; to the extreme end of this wire 106 and within the tube is secured the cathode consisting of a pointed conical tip 104 made of some highly refractory metal such as tungsten. This glass envelope 100 is exhausted of air and gases to a predetermined value and then a predetermined amount of a mono-atomic gas is admitted such as nitrogen, argon, helium, krypton, neon, and xenon, argon being preferred.

In Figure 2 is shown a tube similar to the one disclosed in Figure 1 except that there are provided two carbon targets for the purpose of rectifying double waves of alternating current. These targets are designated by the numbers 107 and 109 and have their respective lead-in wires 108 and 110 sealed as described before by their respective seals 111 and 112. The cathode 104 with its lead 106 is similar to the one shown in Figure 1.

In Figure 3 a system for rectification of half waves embodying the several elements of the complete rectifier is shown, and comprises the following features:

Alternating current entering from the main 96 flows into one terminal of the primary winding 97 of a high potential transformer, from this primary the alternating current traverses the wire 95 to the contact 94 of the automatic switch which normally has its contacts closed. Thus from the contact 94 the alternating current passes over the switch contactor 92 and the second contact 93 of the switch and the wire 85 back to the alternating line or supply.

The primary winding 97 of the high potential transformer is thereby energized, with the result that a high potential current is induced in the secondary 98. This high potential current passes over conductor 81 to the rectifier tube terminal 102, to the carbon target 101 and across the gap to the cathode 104 and thence over the tube terminal 106 and wire 80 over an auxiliary spark gap 83, back to the transformer coil 98. Auxiliary gap 83 is provided so as to prevent the low voltage current from passing around the rectifier tube and through coil 98. A condenser 99 of sufficient capacity may be connected across the high potential leads 81 and 80.

Having thus established a high potential discharge across the rectifier tube terminals 101 and 104 a conductive path is established which will allow the lower potential of the line or supply to flow as follows: Current from the main 96 will flow over wire 86 through the direct current load, represented in this case for example by the battery B, thence over wire 89 and the automatic switch coil 90 and wire 87 to the tube terminal 102, thence from the anode 101 across the spark established by the high potential, to the cathode 104 and its terminal 106, and over wire 82 to the supply main 85. The current thus flowing between the terminals of the tube 100 will cause the tip 104 to become heated very quickly, causing it to give off a stream of negative electrons which will bombard the carbon target 101 and thereby prevent the flow of current in the reverse direction. The current then flowing through the battery is a uni-directional current, derived from every other wave or alternation of the alternating current of the mains 85 and 96.

The uni-directional current which flows through the solenoid coil 90 causes the armature of the latter to rise, thereby opening the circuit at the contacts 93 and 94, which opens the circuit through the high potential transformer primary and stops the high tension spark discharge across the tube terminals. The heat derived from the arc caused by the passage of the low potential current is sufficient to maintain the tip 104 at the proper temperature to continue its emission of electrons and consequent rectification.

The great advantage of my novel arrangement consists in using a solid refractory metal cathode of substantial size or volume, instead of a separately heated filament cathode, which has been used hertofore in this art for similar purposes. This solid cathode permits of the rectification of very large currents without destructive effects on the cathode. For instance where for a given size of the tube with cathode filament it was possible heretofore to only rectify currents up to six amperes, the same tube, provided with my improved cathode and circuit arrangements permits of the rectification of currents of the order of 50 to 60 amperes.

In conjunction with this novel feature the arc is started within a vacuum or gas filled tube between two electrodes by the use of a high potential current which is cut off automatically when the current carrying arc is established.

In Figure 4 a double wave rectifier is disclosed. In this modification the tube 100 contains two anodes 107 and 109, provided with terminal leads 108 and 110 respectively, and one common cathode 104 formed similarly to the one described with reference to Figure 3, and provided with terminal lead 106. The high tension starting circuit is arranged in that case between the cathode 104 and one of the anodes, for instance 107 and includes similar elements to those shown in Figure 3. Anode 107 has a direct connection with main 96 of the alternating current source and anode 109 has a direct connection 84 with main 85. Between mains 85 and 96 are connected in series the auto-transformer coils 115 and 116 which carry at their outer ends the full alternating current voltage of the source. To the junction point 114 of these coils is connected the cathode 104, this connection including the direct current load, in this case battery B, and the cut-out relay coil 90, which controls the circuit through the high tension transformer primary 97 in the same manner as shown in Figure 3. The operation of this arrangement is as follows:

Switch 92, 93, 94 being closed, a high tension alternating current is produced in the circuit including transformer coil 98, gap 83, anode 107 and cathode 104 whereby a high tension spark discharge occurs between these two electrodes over which the first low tension impulse or alternation passes, establishing the arc and heating the cathode to the desired extent to cause electron emissions towards both anodes. This first impulse passes from main 96 over anode 107, cathode 104, lead 106, relay coil 90 to the positive terminal of battery B, thence over junction 114 through auto-transformer coil 115 to main 85. The second alternation passes over the main 85, wire 84, lead 110 to anode 109, thence to cathode 104 and lead 106, wire 120, relay coil 90, battery B, over junction point 114 and auto-transformer coil 116 to main 96. As soon as sufficient current flows through coil 90 from any of the initial alternations, switch 92, 93, 94 is opened and the high tension spark discharge interrupted. The tube operates then in a manner similar to that described with reference to Figure 3, except that in the present case both alternations are utilized.

My invention is equally well adapted for rectifying polyphase currents, as any one skilled in the art will appreciate. Figure 5 shows a tube form and its associated circuits for rectifying three phase alternating current as an example.

In this case the tube 100 is provided with three anodes 126, 127, 128, one for each phase main 131, 132, 133 to which they are connected respectively. The cathode 125 common to all three anodes is preferably three-pointed as shown, each point facing one anode. The three mains are connected by auto-transformer coils 134, 135, 136 in star connection, their center 130 being connected to the negative pole of the direct current load, in this case again a battery B, the positive pole being connected over relay coil 90 and lead 120 to cathode 125.

The high tension starting circuit, including transformer coil 98 and spark gap 83 is connected to cathode 125 and one of the anodes, for instance 126. The primary 97 of the high tension transformer is connected over relay controlled switch 92, 93, 94 between phase mains 131 and 132.

When the cut-out switch is closed, the high tension circuit will cause a spark discharge between anode 126 and the cathode and cause the formation of the low voltage arc similar to the manner described before, after which the rectifying action commences in the manner described before.

In Figure 6 I have shown a circuit arrangement for rectifying alternating current by means of a tube provided with two cathodes, one of which is used only for starting the arc, the other being used subsequently thereof for the continued operation. As shown in this figure the tube 100 contains one anode 140 opposite to which are disposed the two cathodes 141 and 142 at an angle to each other and each cathode constituting a solid tip of substantial size. Cathode 142 is directly connected with main 95 of a single phase alternating current and anode 140 is connected to main 96 by way of battery B and relay coil 90 through conductor 146.

The high tension spark discharge circuit consists of secondary transformer coil 98 and spark gap 83 and of cathodes 141 and 142. The primary coil 97 of the high tension transformer is connected between mains 95 and 96 by way of relay controlled switch 92, 93, 94 as before. Moreover, cathode 141 is connected to main 96 by way of switch 144, 145, also controlled by relay coil 90 and operating simultaneously with switch 92—94.

Thus after the high tension spark discharge between the two cathodes has established a path, a low voltage arc is first formed between the two cathodes by means of the circuit connection from main 96, switch 144, 145 to cathode 141, which heats cathode 142 sufficiently to produce the necessary electron discharge from cathode 142 to start the arc between cathode 142 and anode 110. In order to prevent too heavy a current from passing by way of switch 144, 145 and cathode 141, a resistance 143 is interposed in that branch of the circuit. As soon as the arc between anode 140 and cathode 142 is established, direct current pulsations pass through these circuit connections, including relay coil 90, so that by the latter, in the same manner as described before, the high tension current supply is interrupted. At the same time switch 144, 145, is opened so that no more current flows from cathode 141 to 142.

The particular circuit arrangement shown serves the purpose of rectifying only half waves of alternating current, but it is obvious to anyone skilled in the art that this modification is also capable of use for full wave rectification and for all other general uses of the character illustrated and described before.

In Figure 7 is illustrated a form of tube, which is identical with the form shown in Figure 1, except that in place of the conical solid tip 104 disclosed in that figure a helical coil 147 of highly refractory metal is used. This form of cathode may be of advantage for certain purposes.

I claim:—

1. In a rectifier the combination of an envelope having sealed therein and spaced apart a plurality of electrodes of conductive refractory material, one of said electrodes having a heat dissipating capacity relatively lower than the remainder of said electrodes, said envelope containing a monoatomic gas at a pressure above one millimeter of mercury, a source of high potential current suitably connected to produce a spark discharge between said two kinds of electrodes to establish a conductive path therebetween, a source of low potential alternating current connected to said two kinds of electrodes and adapted to supply sufficient current across said path to maintain the electrode of lower heat dissipation at a temperature at which appreciable electron emission will occur to cause uni-directional passage of said alternating current across said electron path, and means for automatically cutting off said high potential source after said electron path has been established.

2. In a rectifier the combination of an envelope having sealed therein and spaced apart a plurality of electrodes of conductive refractory material, one of said electrodes having a heat dissipating capacity relatively lower than the remainder of said electrodes, said envelope containing a monoatomic gas at a pressure above one millimeter of mercury, a source of high potential current suitably connected to produce a spark discharge between said two kinds of electrodes to establish a conductive path therebetween, a source of low potential alternating current connected to said two kinds of electrodes and adapted to supply sufficient current across said path to maintain the electrode of lower heat dissipation at a temperature at which appreciable electron emission will occur to cause uni-directional passage of said alternating current across said electron path, and means operated by said low potential uni-directional current for cutting off said high potential source after said electron path has been established.

3. In a rectifier the combination of an envelope having sealed therein and spaced apart a plurality of electrodes of conductive refractory material, one of said electrodes having a heat dissipating capacity relatively lower than the remainder of said electrodes, said envelope containing argon gas at a pressure above one millimeter of mercury, a source of high potential current suitably connected to produce a spark discharge between said two kinds of electrodes to establish a conductive path therebetween, a source of low potential alternating current connected to said two kinds of electrodes and adapted to supply sufficient current across said path to maintain the electrode of lower heat dissipation at a temperature at which appreciable electron emission will occur to cause uni-directional passage of said alternating current across said electron path, and means for automatically cutting off said high potential source after said electron path has been established.

4. In a rectifier the combination of an envelope having sealed therein and spaced apart a plurality of electrodes of conductive refractory material, one of said electrodes having a heat dissipating capacity relatively lower than the remainder of said electrodes, said envelope containing a mono-atomic gas at a pressure of at least one centimeter of mercury, a source of high potential current suitably connected to produce a spark discharge between said two kinds of electrodes to establish a conductive path therebetween, a source of low potential alternating current connected to said two kinds of electrodes and adapted to supply sufficient current across said path to maintain the electrode of lower heat dissipation at a temperature at which appreciable electron emission will occur to cause uni-directional passage of said alternating current across said electron path, and means for automatically cutting off said high potential source after said electron path has been established.

5. In a rectifier the combination of an envelope having sealed therein and spaced apart a plurality of electrodes of conductive refractory material, one of said electrodes having a heat dissipating capacity relatively lower than the remainder of said electrodes, said envelope containing a mono-atomic gas at a pressure above one millimeter of mercury, a source of low potential alternating current connected to said two kinds of electrodes, a high potential alternating current circuit including a secondary transformer coil, a condenser in shunt thereto, a spark gap and at least one of each of said two kinds of electrodes, said circuit adapted to produce a spark discharge between said two kinds of electrodes to establish a conductive path therebetween, a primary transformer coil in inductive relation to said secondary coil and connected to said source of low potential alternating current, said connection including a switch, a relay coil for controlling said switch and connected in circuit with one of said two kinds of electrodes and the low potential alternating current source, said low potential source adapted to supply sufficient current across said conductive path to maintain the electrode of lower heat dissipation at a temperature at which appreciable electron emission will occur to cause uni-directional passage of said low potential alternating current across said electron path, the circuit including said primary coil being interrupted by said switch when said uni-directional current flows, and a utility device in circuit with said electrodes and said relay coil, adapted to consume said uni-directional current.

6. In a rectifier the combination of an envelope having sealed therein and spaced apart a plurality of electrodes of conductive refractory material, one of said electrodes having a heat dissipating capacity relatively lower than the remainder of said electrodes, said envelope containing argon gas at a pressure above one millimeter of mercury, a source of low potential alternating current connected to said two kinds of electrodes, a high potential alternating current circuit including a secondary transformer coil, a condenser in shunt thereto, a spark gap and at least one of each of said two kinds of electrodes, said circuit adapted to produce a spark discharge between said two kinds of electrodes to establish a conductive path therebetween, a primary transformer coil in inductive relation to said secondary coil and connected to said source of low potential alternating current, said connection including a switch, a relay coil for controlling said switch and connected in circuit with one of said two kinds of electrodes and the low potential alternating current source, said low potential source adapted to supply sufficient current across said conductive path to maintain the electrode of lower heat dissipation at a temperature at which appreciable electron emission will occur to cause uni-directional passage of said low potential alternating current across said electron path, the circuit including said primary coil being interrupted by said switch when said uni-directional current flows, and a utility device in circuit with said electrodes and said relay coil, adapted to consume said uni-directional current.

7. In a rectifier the combination of an envelope having sealed therein and spaced apart two groups of electrodes of conductive refractory material, one of said groups comprising at least one anode, the other group comprising a plurality of cathodes, the cathode group having a lower heat dissipating capacity than the anode group, said envelope also containing a mono-atomic gas at a pressure above one millimeter of mercury, a source of high potential current, suitably connected to produce a spark discharge between said several cathodes to establish a conductive path therebetween, a source of low potential alternating current connected to said anode and cathode group, an auxiliary circuit including said low potential source, a resistance and the conductive path between said cathodes, permitting said low potential current to flow across said conductive path and to maintain one of said cathodes at a temperature at which appreciable electron emission will occur to cause uni-directional passage of said alternating current between said cathode and the anode group, a cut-out relay located in circuit with said anode group and the source of low potential alternating current and adapted to interrupt said source of high potential current and said auxiliary circuit when said uni-directional current flows, and a utility device in said anode circuit adapted to consume said uni-directional current.

8. In a rectifier the combination of an envelope containing a mono-atomic gas at a pressure above one millimeter of mercury and having sealed therein an electrode composed of conductive refractory material having a relatively high heat dissipating capacity and an electrode in close proximity thereto having a tip composed of conductive refractory material and designed to have considerably less heat dissipating capacity than the first mentioned electrode.

9. In a rectifier the combination of an envelope containing a mono-atomic gas at a pressure above one millimeter of mercury and having sealed therein an electrode composed of conductive refractory material having a relatively high heat dissipating capacity and an electrode in close proximity thereto having a tip composed of conductive refractory material in the form of a helix designed to have considerably less heat dissipating capacity than the first mentioned electrode and a terminal for holding said helix and having a conductive capacity considerably greater than said helix.

10. An alternating current rectifier and its associated circuits, comprising a rectifier tube having at least one anode and one cathode spaced apart and adapted to have an arc between them, a source of alternating current connected to said electrodes and adapted to maintain said arc and to be rectified by said tube, and an auxiliary circuit carrying a high potential current adapted to bridge the space between said electrodes to form an initial path for the arc, said circuit being suitably connected to said alternating current source to produce high potential current, and means controlled by the flow of rectified current for cutting off said high potential current supply when the arc has been formed.

JAMES K. ELDERKIN.